(12) United States Patent
May

(10) Patent No.: US 8,410,900 B2
(45) Date of Patent: Apr. 2, 2013

(54) METHOD FOR PROCESSING RECEIVED EVENT MESSAGE

(75) Inventor: Scott M. May, Honeoye Falls, NY (US)

(73) Assignee: Robert Bosch GmbH, Stuttgart (DE)

( * ) Notice: Subject to any disclaimer, the term of this patent is extended or adjusted under 35 U.S.C. 154(b) by 501 days.

(21) Appl. No.: 12/729,679

(22) Filed: Mar. 23, 2010

(65) Prior Publication Data

US 2011/0234393 A1 Sep. 29, 2011

(51) Int. Cl.
*G05B 19/00* (2006.01)
*H04M 7/00* (2006.01)
*H04B 7/00* (2006.01)

(52) U.S. Cl. ............... 340/5.65; 340/870.11; 340/5.61; 340/7.2; 340/10.52; 340/534; 379/220.01; 379/386

(58) Field of Classification Search ............... None
See application file for complete search history.

(56) References Cited

U.S. PATENT DOCUMENTS

| | | | |
|---|---|---|---|
| 3,952,285 A | 4/1976 | Falck, Jr. | |
| 4,672,365 A | 6/1987 | Gehman et al. | |
| 4,754,261 A | 6/1988 | Marino | |
| 5,440,301 A * | 8/1995 | Evans | 340/870.11 |
| 5,801,626 A | 9/1998 | Addy | |
| 5,812,054 A | 9/1998 | Cohen | |
| 5,835,574 A * | 11/1998 | Lam | 379/90.01 |
| 7,084,756 B2 | 8/2006 | Stilp | |
| 2005/0008004 A1* | 1/2005 | Williams | 370/352 |
| 2006/0114100 A1* | 6/2006 | Ghabra et al. | 340/5.61 |
| 2007/0105586 A1* | 5/2007 | Kim et al. | 455/525 |
| 2007/0256105 A1 | 11/2007 | Tabe | |
| 2008/0037758 A1* | 2/2008 | Saito et al. | 379/220.01 |
| 2010/0008493 A1* | 1/2010 | Marum et al. | 379/386 |

FOREIGN PATENT DOCUMENTS

| | | |
|---|---|---|
| DE | 100 25 627 | 12/2001 |
| WO | 01/37589 | 5/2001 |
| WO | 2009/112891 | 9/2009 |

OTHER PUBLICATIONS

Schulzrinne Columbia U T Taylor Nortel H: "RTP Payload for DTMF Digits, Telephony Tones, and Telephony Signals; rfc4733.txt", IETF Standard, Internet Engineering Task Force, IETF, CH, Dec. 1, 2006.
International Search Report and Written Opinion of the International Search Authority, International Patent Application No. PCT/US2011/029524, dated Jul. 27, 2011.
Li, Guorui, "Group-Based Intrusion Detection System in Wireless Sensor Networks", Computer Communications, vol. 31, No. 18, pp. 4324-4332, Dec. 18, 2008.
Arrue, B.C., "An Intelligent System for False Alarm Reduction in Infrared Forest-Fire Detection", Intelligent Systems and Their Applications, vol. 15, issue 3, pp. 64-73, May/Jun. 2000.

\* cited by examiner

*Primary Examiner* — Jennifer Mehmood
*Assistant Examiner* — Fekadeselassie Girma
(74) *Attorney, Agent, or Firm* — Michael Best & Friedrich LLP

(57) ABSTRACT

Techniques for processing an incoming message from premises equipment at a monitoring location. In one embodiment, an event message, including digits with varying amplitudes, is generated at a premises (such as a home, office, factory, etc.) in response to an event at the premises. A communication channel is established between the premises equipment and the monitoring location and the event message is sent from the premises equipment to the monitoring location. The entire event message is evaluated based on the number of digits received compared to expected receiving parameters defined in a communication protocol. A number of possible interpretations of the event message is determined. One or more possible interpretations of the event message are eliminated based on the number of digits in each of the possible interpretations to create a subset of possible interpretations. Receipt of the event message is determined by selecting one possible interpretation from the subset of possible interpretations based upon the number of digits received by the monitoring location within a predetermined protocol time.

21 Claims, 6 Drawing Sheets

METHOD FOR PROCESSING RECEIVED EVENT MESSAGE

FIELD

The present invention relates to communication systems and methods of processing event messages. More particularly, embodiments of the invention relate to processing of event messages that have been disrupted by interference or faults in either a transmitting network or sending premises equipment. These communication systems may include fire systems, security systems, access control systems, or other similar systems that use time-based communication protocols.

BACKGROUND

Existing event message communication systems, such as building fire and security systems typically send event information or premise data in the form of analog data tones that are formatted as digital data to central monitoring centers. Such event messages are sent via the Public Switched Telephone Network (PSTN) or cellular (telephone) networks. The digital data included in the message can be sent in several different ways. Typically, the data is sent using a Dual Tone Multiple Frequency (DTMF) or Frequency Shift Key (FSK) signaling, but other techniques can be used. Specific examples of DTMF and FSK communication protocols are Ademco® Contact ID Protocol ("SIA DC_05") and the "SIA Format" Protocol ("SIA DC_03").

Time-based communication protocols usually define specific timing requirements and tolerances for receiving event messages. Today's receiving equipment manufacturers typically extend the timing tolerance of the communication protocol beyond the defined limits in order to allow signals from premises that do not meet the published standard limits or to account for equipment variations over time. This is common practice in the industry.

SUMMARY

More and more frequently, telephone companies compress voice data to increase call capacities. Sending reliable event messages (in a voice channel) has become increasing difficult because the compression techniques impact the data being sent by fire alarm, security, and similar systems. Signal noise, transmission timing variations, signal distortions (due to, for example, compression), and transmission conversion can adversely affect transmitted event messages. In addition, the premises equipment tolerances degrade the protocol signals beyond the point where the receiving equipment can correctly interpret the received event message. This causes the message to be resent a second time in the same communication session or failed and tried again in a new transmission session. Repeated communications of the same message impacts the receiving equipment throughput capacity and the response time from the monitoring center.

In addition to problems associated with compression and noise, additional challenges are caused by transitions from standard telephone equipment to Voice over Internet Protocol (VoIP) and similar digital communication methods. In many instances, when these switchovers occur, premises equipment can no longer send reliable communications to the receiving equipment. This means that customers must replace their existing equipment with an IP-based or wireless equipment. Worse still, in some cases, a customer may fail to understand the impact of a switch from POTS (plain old telephone system) equipment to a newer phone service and not recognize that his or her fire, security, or access control system no longer functions as previously tested and approved.

Communication between premises equipment and monitoring centers becomes more difficult when the challenges described above are applied to cellular communication networks. In cellular networks, the event message is transmitted over the air and then connected to the PSTN network. The added breaks, gaps, transmission timing variations and noise from the cellular network often degrade the signal beyond the point that it can be processed correctly by receiving equipment.

To solve these problems, embodiments of the present invention provide a method and a system for processing event messages where the receiving equipment processes and evaluates the entire event message based on the number of received digits compared against the expected communication protocol result and not based on the specific timing of each data digit defined by the specific communication protocol. This method removes the critical timing parameters of the event message that are influenced by the premise equipment and the transmitting network and improves the probability of successfully receiving the event message.

Embodiments of the invention can also be applied to communication devices that are connected at a variety of locations in the network between the premises equipment and the receiving equipment. In addition, techniques described can also be applied to other communication technologies beyond PSTN and cellular networks, such as long- and short-range radio.

In one embodiment, the invention provides method of processing an event message received from premises equipment. The event message is generated at a premises (such as a home, office, factory, etc.) in response to an event at the premises. A communication channel is established between the premises equipment and the monitoring location and the event message is sent from the premises equipment to the monitoring location. The entire event message, including digits with varying amplitudes, is evaluated based on the number of digits received compared to expected receiving parameters defined in a communication protocol. A number of possible interpretations of the event message are determined. One or more possible interpretations of the event message are eliminated based on the number of digits in each of the possible interpretations to create a subset of possible interpretations. Receipt of the event message is determined by selecting one possible interpretation from the subset of possible interpretations based upon the number of digits received by the monitoring location within a predetermined protocol time.

In another embodiment, the invention provides a system for processing an incoming message signal. The system includes premises equipment configured to generate and send an event message in response to an event at a premises. A receiver is configured to evaluate and receive the event message and a network connects the premises equipment and the receiver. The receiver evaluates the entire event message, including digits with varying amplitudes, based on the number of digits received compared against the expected receiving parameters defined in a communication protocol and determines receipt of the event message based upon the number of digits received by the receiver within a predetermined protocol time.

Other aspects of the invention will become apparent by consideration of the detailed description and accompanying drawings.

DETAILED DESCRIPTION

Figure 1:
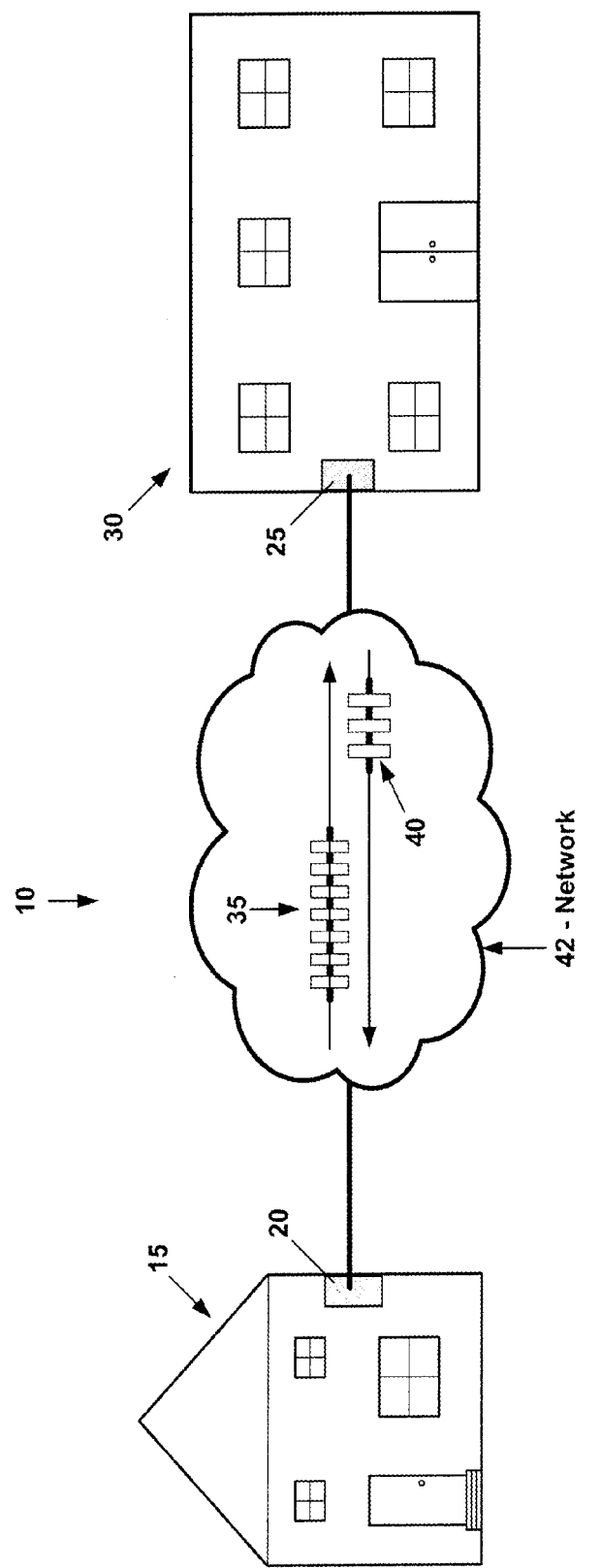
FIG. 1 is a schematic illustration of a system for processing a received event message.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As should also be apparent to one of ordinary skill in the art, the systems shown in the figures are models of what actual systems might be like. Many of the modules and logical structures described are capable of being implemented in software executed by a microprocessor or a similar device or being implemented in hardware using a variety of components. As described in subsequent paragraphs, the specific configurations illustrated in the drawings are intended to exemplify embodiments of the invention and other alternative configurations are possible. A plurality of different structural components may be utilized to implement the invention. Furthermore, throughout the specification capitalized terms are used. Such terms are used to conform to common practices and to help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

FIG. 1 illustrates one embodiment of a system for processing a received event message. The system 10 generally includes premises equipment 20 located at a house, store, office, or similar premises 15 and a receiver 25 located at a monitoring location 30. An event message 35 is generated by the premises equipment 20 based on a particular event (smoke, fire, security breach, unauthorized access, etc.) and is sent from the premises 15 to the receiver 25 that is located at the monitoring location 30 (e.g., central monitoring center, local security facility, emergency response center, etc.).

For the purpose of illustrating the operation of system 10, the Ademco ® Contact ID Protocol (SIA DC_05) will be used as an example. The Ademco ® Contact ID protocol is a DTMF (Dual Tone Multiple Frequency) based protocol. However, the system 10 can be applied to and used with other time-based communication protocols.

In the embodiment shown in FIGS. 1-6, the premises equipment 20 sends a message to the receiver 25 at the monitoring location 30 when an alarm or other event occurs. As shown in FIG. 1, the receiver 25 sends out a handshake tone 40 over network 42 and waits for a response from the premises equipment 20. Depending on the equipment, multiple handshake tones 40 are typically sent with a pause or a response time window. If there is no response from the premises equipment 20 to a handshake tone 40 during the time window, the receiver 25 moves to the next handshake tone in a predetermined list. When the premises equipment 20 detects the correct handshake tone 40 it starts transmitting the event message 35. The event message 35 contains event message data. If the event message 35 is correctly received by the receiver 25, an acknowledgment tone (ACK) is sent from the receiver 25 to notify the premises equipment 20 that the event message 35 was received correctly. Depending on the communication protocol used, the receiver's 25 reply to an incorrectly received event message 35 could be a Negative Acknowledge (NAK) message or no response at all.

Figure 2:
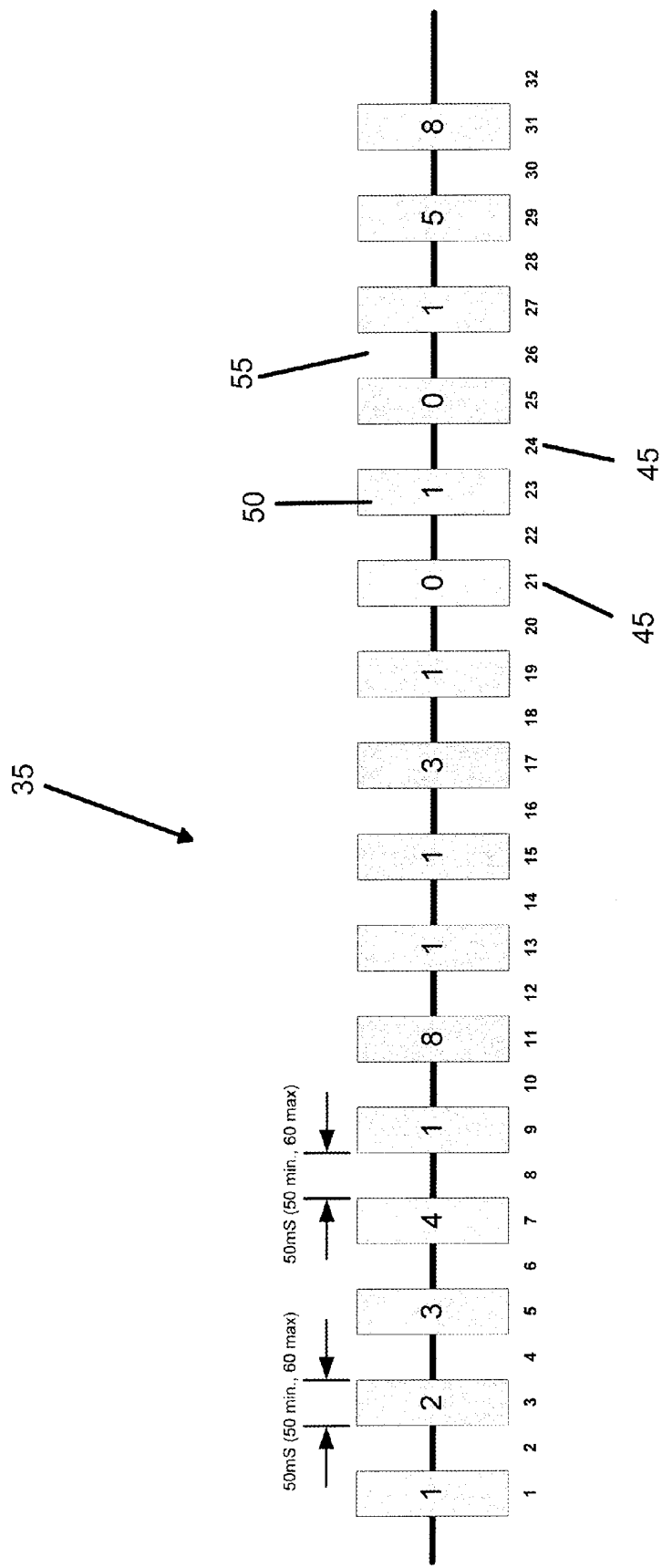
FIG. 2 an illustration of an event message sent from premises equipment.

FIG. 2 represents an actual event message 35 when captured from a typical premises equipment 20. The event message includes a predetermined number of digits 45. The digits 45 are generally two types—"on" or data digits 50 and "off" or quiet digits 55. The data digits 50 include event message data and the quiet digits 55 represent off time, which does not include event message data. Ideally, the event message includes only data digits 50 and quiet digits 55 and all digits 45 have nearly the same amplitude. In practice, the amplitude of digits 45 varies depending on the message signal noise, transmission timing variations, message signal distortions, and transmission conversion effects from either the transmitting network or the premises equipment 20. When the amplitude of digits 45 varies significantly, the event message 35 is undecodable by the receiver 25 and, as a consequence, the event message 35 is not received at the monitoring location 30.

Generally, the Ademco ® Contact ID Protocol (SIA DC_05) defines the timing parameters of the event message 35 as part of the specification of the protocol. Defining specific timing parameters in the specifications is common for time-based protocols. As shown in FIG. 2, in one embodiment each DTMF data digit 50 is sent at 50 ms "on" time (data digit) followed by 50 ms "off" time (quiet digit). In other embodiments, the timing parameters and the "on" and "off" times for the digits 45 of the event message 35 may be different. As further illustrated in FIG. 2, the event message 35 comprises a total of 32 digits. Of these 32 digits, 16 are data digits and 16 are quiet digits. In other embodiments and as defined in other communication protocols, the quiet digits 55 can be a carrier frequency, which is not data as defined by the protocol. The numbers shown inside the boxes represent the DTMF digit/value for a received data digit 50.

Typically, the receiver 25 extends or shortens its receiving timing parameters beyond the specification of the communication protocol in order to accommodate for tolerances in either the receiver 25 or premises equipment 20. For example, the receiver 25 utilized in the Ademco ® Contact ID Protocol must extend its predefined timing parameters between 40 ms minimum and 70 ms maximum duration in order to detect a digit 45 that is either a data digit 50 or a quiet digit 55.

Figure 3:
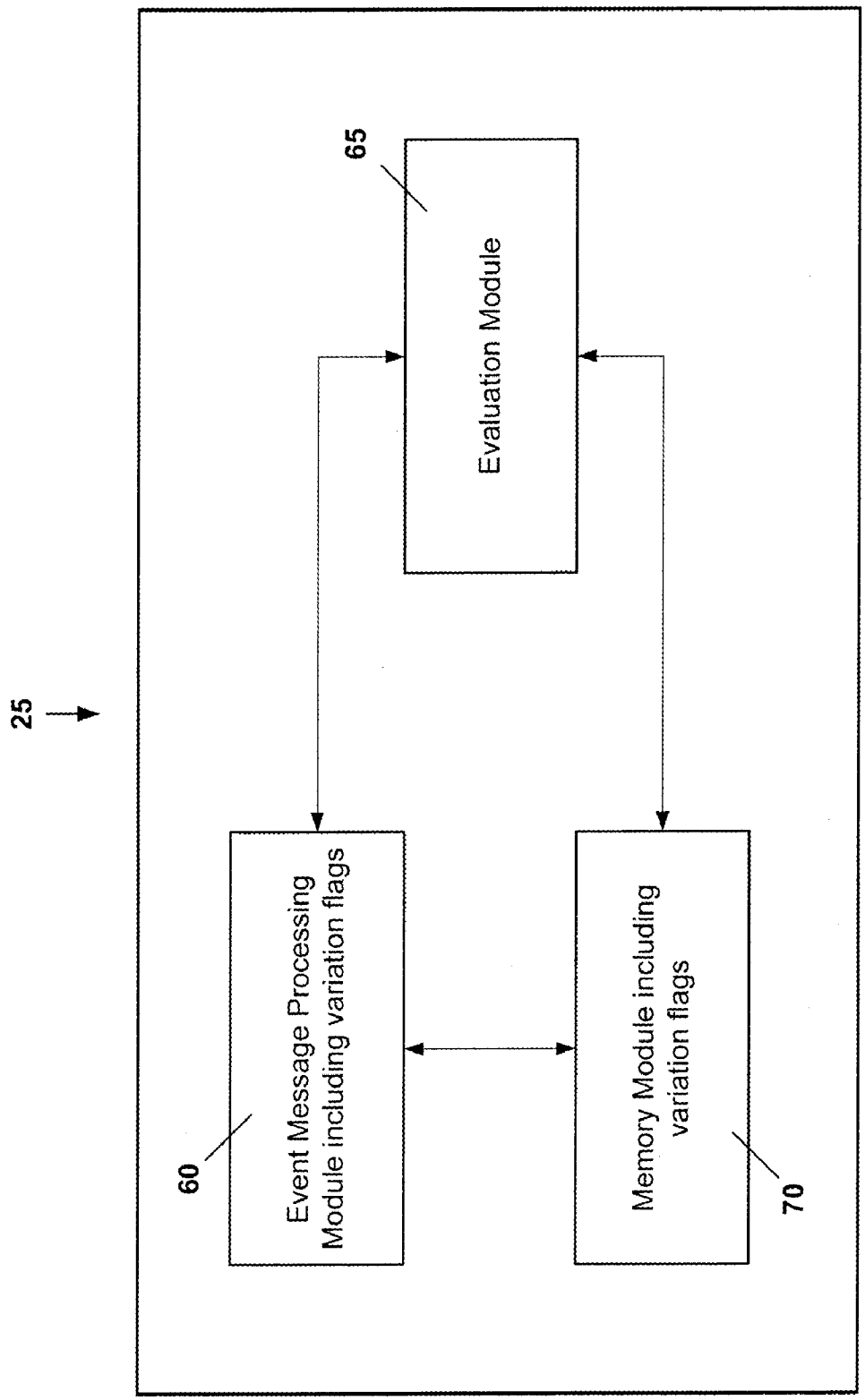
FIG. 3 is a block diagram of an exemplary receiver used in the system for processing a received event message.

FIG. 3 illustrates the exemplary receiver 25 of FIG. 1 in greater detail. In the embodiment shown in FIG. 3, the receiver 25 includes an event message processing module 60, an evaluation module 65, and a memory module 70. In other embodiments, the receiver 25 may include a variety of other processing and/or memory modules.

The event message processing module 60 evaluates the entire event message 35 received by the receiver 25 based on the total number of digits 45 received and compared against the expected communication protocol standard, instead of processing the incoming event message 35 based on the specific timing requirements of each data digit set forth by the communication protocol specification. First, the module 60 determines if the received event message 35 is a valid 16-digit message. If the processing module 60 determines that there is only one valid 16-digit interpretation of the event message 35, the module 60 confirms receipt of the message 35 by sending an acknowledgment tone to the premises equipment 20. By analyzing the entire message and not the timing of each data digit, the system 10 evaluates and accepts messages that would not have been accepted by the standard systems for processing event messages. For example, the system 10 would consider two consecutive "on" digits 50 without any "off" time between these digits, where an old system would have rejected these digits because their specific timing does not correspond to the protocol standards. Therefore, by analyzing the entire event message 45, the system 10 reduces failed messages caused by signal noise, transmission timing variations, signal distortions, and transmission conversion effects from either the network or the premises equipment 20.

In some embodiments, the event message processing module 60 determines a number of possible interpretations of the event message 35 based on various effects from the transmitting network and/or the premises equipment 20. The module 60 evaluates the message 35 and can create variation flags every time there is an inconsistency with a specific digit 45 in the message analysis as compared to the expected message result set by the communication protocol standard. Further, the module 60 eliminates the invalid interpretations of the event message 35 in order to create a subset of valid interpretations. The invalid interpretations include messages that have a number of digits greater than the predetermined number of digits to be received (e.g., more than sixteen received data digits 50). Having two or more valid interpretations of the message 35 indicates to the receiver 25 that there is interference in the received event message 35. In that case, the module 60 could stop the processing of the message 35, stores the valid possible interpretations of the message 35 in the memory module 70, and sends a NAK message and a retry message to the premises equipment 20 thus rejecting the message 35. After the premises equipment 20 receives the NAK and retry messages, it resends the event message 35 and, therefore, creates a resent event message. Generally, each communication protocol defines a standard number of retry attempts for a returned message. The event message processing module 60 again evaluates the entire resent event message 35 by analyzing the total number of digits 45 included in the message 35 and comparing that number to the specifications of the communication protocol.

The evaluation module 65 provides additional processing and evaluation of the digits 45 of both the original and the resent event message 35. When the resent message 35 has a valid 16-digit interpretation, the evaluation module 65 compares the data digits 50 of that valid interpretation with the data digits 50 of the original event message 35 stored in the memory module 70. The evaluation module 65 verifies whether the digits of the resent event message are included in the subset of interpretations of the original event message. The evaluation module 65 can also verify if there are multiple correct interpretations of the resent message compared to the stored interpretations of the original message and what is the number of variation flags of the resent message compared to the protocol standard. When certain criteria are met, the evaluation module 65 confirms receipt of the message 35 by sending an acknowledgment tone to the premises equipment 20.

The memory module 70 includes a memory device that can be used to store various interpretations of the event message 35 generated by the event message processing module 60. For example, in one embodiment, the memory module 70 includes a random access memory ("RAM"). In other embodiments, other memory devices can be implemented in the memory module 70. The memory module 70 can also receive data from the evaluation module 65 or other components of the system 10.

Figure 4:
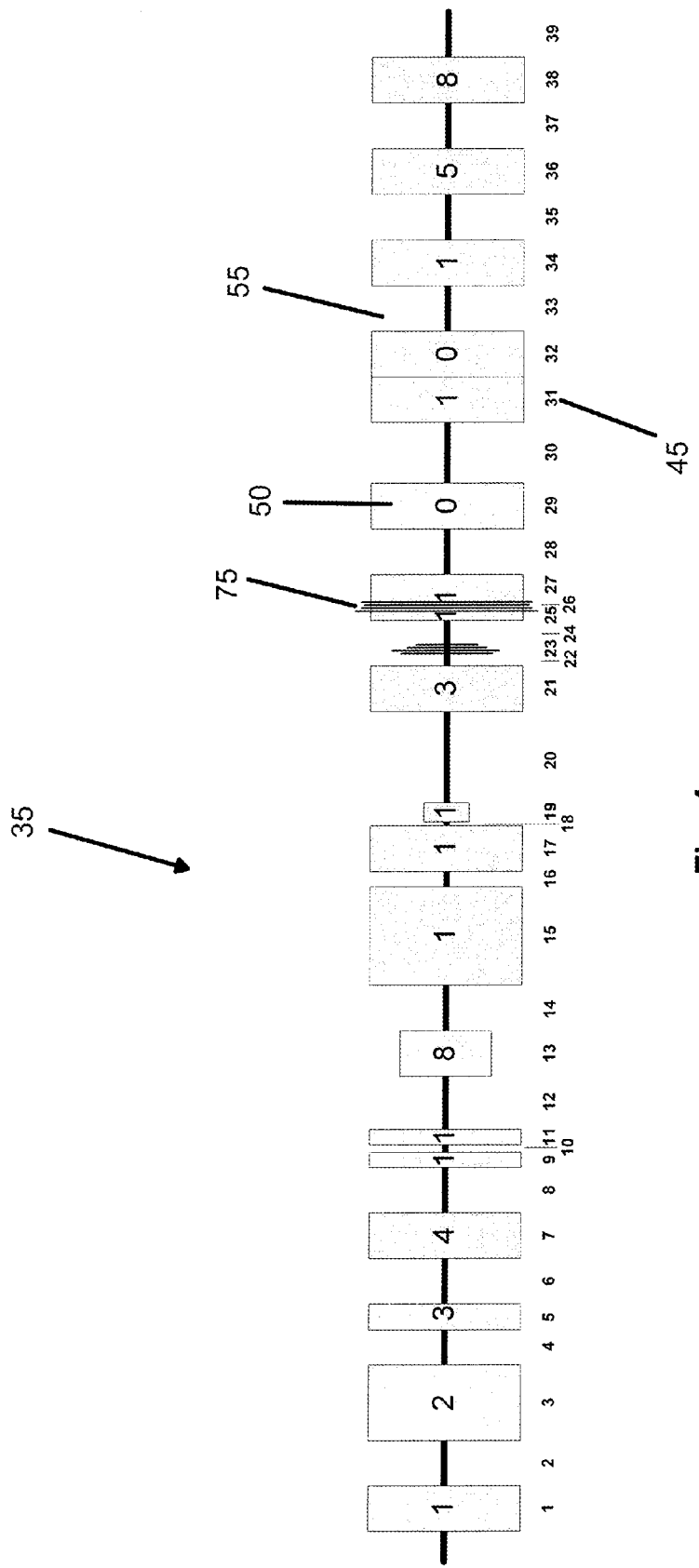
FIG. 4 is an illustration of an event message that has been disrupted (or corrupted) by the transmitting network and the sending premises equipment to such an extent that it is not understandable or properly received by receiving equipment.

FIG. 4 illustrates an example of event message 35 sent from premises equipment 20 and processed by a receiver 25. The event message in FIG. 4 includes signal noise, transmission timing variations, signal distortions, and transmission conversion effects. This example represents a severe or worst case scenario where the event message 35 is significantly distorted and the receiver 25 would not be able to decode or understand the message 35 due to the noise and distortion. As shown in FIG. 4, instead of receiving the data digits 1234181131010158 as a valid 16-digit event message 35 (as in FIG. 2), the receiver 25 receives an invalid message 35 with the following data digits 12341181113?11010158. Thus, instead of interpreting the message as having sixteen digits the receiver 25 actually interprets (or reads) the message as having twenty digits.

The receiver 25 evaluates the actual duration and content of the entire event message 35 by performing the analysis shown in FIG. 4 in the event message processing module 60. Digit 3 is received in a time-extended format, but still as a valid DTMF digit 2. Digit 5 is received in a time-shortened format, but still as a valid DTMF digit 3. As a result, up through digit 8 the message 35 includes the following DTMF digits "1234." Due to the short duration of digits 9, 10, and 11 and the fact that digits 9 and 11 have the same DTMF value (1), the receiver 25 can treat digits 9 and 11 as two separate digits or a single digit with the DTMF value of 1. Thus, the receiver 25 can decode one of two possible interpretations: "12341" or "123411."

Digit 13 has decreased amplitude and is decoded properly as having a shorter signal duration and DTMF value of 8. Digit 15 is twice the length of the actual expected signal and could be considered to be two DTMF digits (value of 1) with no space, or a single DTMF digit (value of 1). This creates another option for the final interpretation as the entire event message 35 has not been completely analyzed yet. Thus, up through digit 16, the receiver 25 has four possible interpretations: "1234181," "12341811," "12341181," and "123411811."

The event message processing module 60 continues to analyze the event message shown in FIG. 4 and determines that the duration of digit 16 is short and the next digit 17 has the same DTMF value (1) as the previous digit 15. Thus, the receiver 25 has 8 possible interpretations: "1234181," "12341811," "12341811," "123418111," "12341181," "123411811," "123411811," and "1234118111." Further, the "off" of digit 18 is very short and digit 19 has the same value as digit 17, but has a significantly reduced amplitude. Since the amplitude of digit 19 is very low and of the same value as the previous DTMF digit, it is more likely to be considered an echo and disregarded. If the amplitude of digit 19 was higher, it would have been added as a possible solution to the growing list of interpreted messages 35.

Digit 20 is an extended quiet "off" period that has longer then expected quiet period. This is added to the list with variation flags in the event processing module 60 of the receiver 25. Thus, up through digit 22 the receiver 25 has the following 8 possible interpretations: "12341813,"

"123418113," "123418113," "1234181113," "123411813," "1234118113," "1234118113," and "12341181113."

Digit 23 is detected, but no valid DTMF digit is determined which causes another variation flag to be set in the event processing module 60. Digit 25 is detected as a time shortened DTMF digit 1, followed by noise 75 not detected as a valid DTMF digit (digit 26), followed by digit 27 that was detected as a time shortened DTMF digit 1. Thus, up through digit 28 the receiver 25 has sixteen possible interpretations: "123418131," "1234181311," "1234181131," "12341811311," "1234181131," "12341811311," "12341811131," "123418111311," "1234118131," "12341181311," "12341181131," "123411811311," "12341181131," "123411811311," "123411811131," and "1234118111311."

Digits 31 and 32 are detected and noted as two different DTMF values with no space. If the receiver 25 had determined that digits 31 and 32 have the same value, this would have added to the number of potential possibilities and added to the variation flags in the event processing module 60. When the receiver 25 adds the final decoded DTMF digits there are a total of sixteen possible interpretations:

1—"12341813101015 8"—short only 15 digits—rejected
2—"1234181311010158"—correct length, valid checksum—possible solution
3—"1234181131010158"—correct length, valid checksum—possible solution
4—"12341811311010158"—too many digits—rejected
5—"1234181131010158"—correct length, valid checksum—possible solution
6—"12341811311010158"—too many digits—rejected
7—"12341811131010158"—too many digits—rejected
8—"123418111311010158"—too many digits—rejected
9—"1234118131010158"—correct length, invalid protocol format—rejected
10—"12341181311010158"—invalid protocol format and too many digits—rejected
11—"12341181131010158"—invalid protocol format and too many digits—rejected
12—"123411811311010158"—invalid protocol format and too many digits—rejected
13—"12341181131010158"—invalid protocol format and too many digits—rejected
14—"123411811311010158"—invalid protocol format and too many digits—rejected
15—"12341181131010158"—invalid protocol format and too many digits—rejected
16—"123411811311010158"—invalid protocol format and too many digits—rejected It should be noted that after reaching solution 3, the receiver 25 could stop analyzing the data of the event message 35 since there are at least two different valid event message interpretations. Referring to the original solution analysis, as soon as the receiver 25 determines that there are multiple interpretations with the same potential answer (at digit 16), the receiver 25 can determine that there is too much interference in the event message 35. The receiver 25 can stop processing and send a negative acknowledge (NAK) to the premises equipment 20 to reject the message and retry it. On the other hand, if the receiver 25 receives only one interpretation with no potential conflicts then the premise equipment 20 receives a positive acknowledgement (ACK) or "kiss off" tone.

Figure 5:
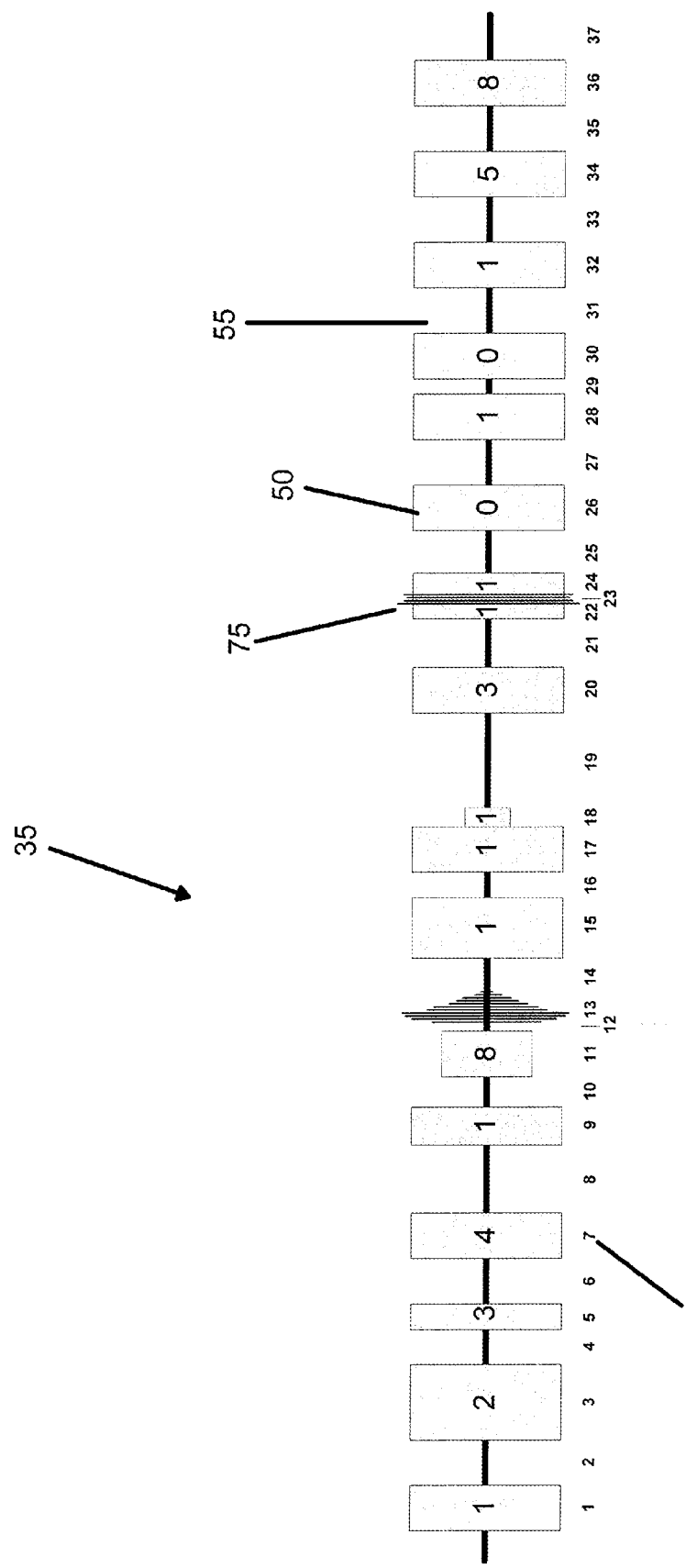
FIG. 5 is an illustration of an event message that is disrupted by the transmitting network and the sending premises equipment, but is still understandable or receivable by receiving equipment.

FIG. 5 illustrates another example event message 35 sent from premises equipment 20 and processed by a receiver 25. This shows a more typical event message 35 with some small distortions created by the premises equipment 20 and the transmitting network 42. As shown in FIG. 5, digits 1-11 are processed by the receiver 25 without decoding or interpretation difficulties. Digit 12 is detected as short and digit 13, is detected but not as a valid DTMF digit. Digits 17 and 18 are detected. However, due to reduced amplitude, digit 18 is considered an echo and ignored due to its amplitude. Based on the digits received through digit 21, the receiver 25 has the following result: "123418113."

Digit 22 is detected as a time-shortened DTMF digit 1, followed by noise 75 (which is not detected as a valid DTMF digit (digit 23)), followed by digit 24 that is detected as a time shortened DTMF digit 1. Thus, up through digit 25 the receiver 25 has two possible interpretations: "1234181131" and "12341811311." The remaining evaluation of the message 35 creates two possible final interpretations: "1234181131010158"—that has a correct 16-digit length and is a possible solution; and "12341811311010158"—that has too many digits (17) and is rejected by the receiver 25.

If the message 35 in FIG. 5 is the first event message 35 received in a communication session between the premises 15 and monitoring location 30, the receiver 25 selects interpretation 1 from the solution results (or group of possible interpretations) and sends a receipt acknowledgement (kiss off) signal to the premises equipment 20. If the message 35 in FIG. 5 is a resent message (second try), the correct interpretation (solution 1) is compared with the correct interpretations of the original event message 35 to verify that the resent message is one of the expected results. Because the message 35 illustrated in FIG. 4 represents an extreme or worst-case type message, it is weighted as a low probability based on the number of variation flags created and the results of the resent message (FIG. 5) are used since the content of the resent message is closer to the protocol standard and includes significantly less variation flags. The number of permissive variation flags can vary depending on the standard set by the particular communication protocol and every communication protocol can have several levels of variation flag standards.

Figure 6:
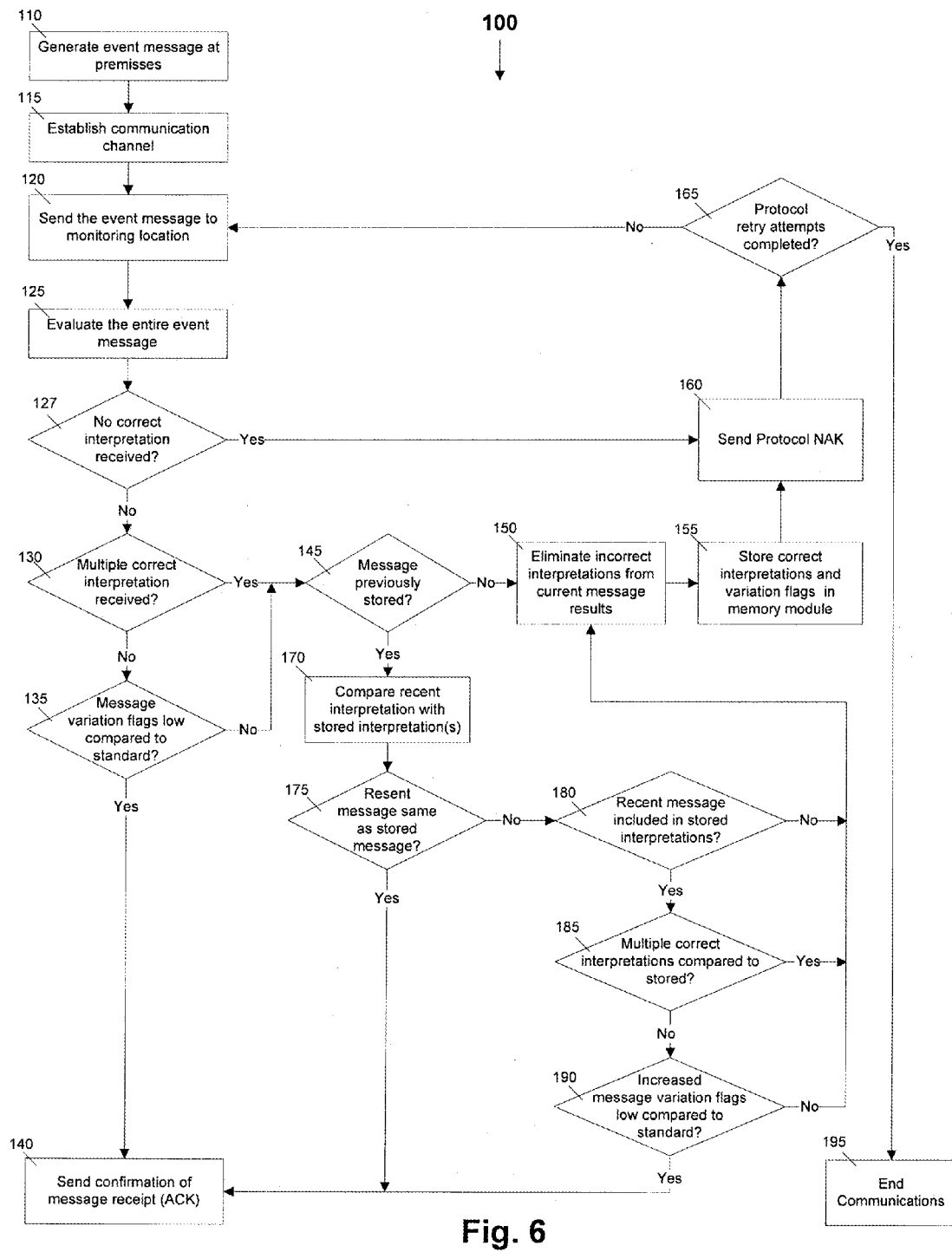
FIG. 6 is a flow chart of a technique that can be used to process a received event message at a monitoring center.

FIG. 6 illustrates a method 100 that can be used to process a received event message 35 at monitoring location 30. In some embodiments, the method 100 is carried out or evaluated by the receiver 25 shown in FIGS. 1 and 3 The first step in the method is to generate an event message 35 (step 110). The event message 35 is generated at the premises 15. The next step in the method 100 is to establish a communication channel between the premises equipment 20 and the monitoring location 30 (step 115). After a communication channel is established, the receiving equipment sends out the handshake tone 40 to the premises equipment 20. When the correct tone is received at the premise equipment 20, the event message 35 is sent to the receiver 25 of the monitoring location 30 (step 120). The event message processing module 60 evaluates the entire event message 35 (step 125) based on the number of received digits 45 compared against the expected protocol results, and if no correct interpretations were received (step 127) a protocol NAK is sent (step 160). Next, the evaluation module 65 determines if any protocol retry attempts remain available (step 165). If there are no retry attempts remaining at step 165, evaluation module 65 stops processing and terminates the network communication path 42 at the receiving equipment 25 (step 195). If retry attempts still remain, then the evaluation module 65 starts the process over at step 120. Steps 120 through 127 are repeated again for the retried event message 35. If at least one possible correct interpretation is received, the receiver 25 determines whether there is more than one possible interpretation of the event message 35 (step 130). If there is only one correct interpretation of the event message 35 and the variations detected in the event message 35 compared to the protocol standard are low (step 135) the receiver 25 confirms receipt of the message 35 by sending an acknowledgment tone to the premises equipment 20 (step 140).

If there is more than one interpretation of the event message 35, the receiving equipment 25 determines if a previous message was received and stored (step 145). If a previous message was not detected, the event message processing module 60 eliminates the invalid interpretations of the message 35 to create a subset of valid interpretations (step 150). Then, the valid interpretations of message 35 and the number of variations (variation flags) detected are stored in the memory module 70 (step 155). In the next step, the module 60 rejects the event message 35 and sends a protocol NAK message (step 160). Next, the evaluation module 65 determines if any protocol retry attempts remain available (step 165). If there are no retry attempts remaining at step 165, evaluation module 65 stops processing and terminates the network communication path 42 at the receiving equipment 25 (step 195). If retry attempts still remain, then the evaluation module 66 starts the process over at step 120. Steps 120 through 130 are repeated again for the retried event message 35.

If the retried event message 35 has multiple correct interpretations (steps 130 and 145), the evaluation module 65 compares the data digits 50 of the valid interpretation of the resent message 35 with the data digits 50 of the original event message 35 that are stored in the memory module 70 (step 170). The evaluation module 65 determines if the resent message 35 is exactly the same as the original event message 35 (step 175), where the original message had only one correct interpretation but the number of variations was too high (step 135), and if this is the case, the receiver 25 confirms receipt of the resent message 35 by sending an acknowledgment tone to the premises equipment 20 (step 140).

If the resent event message 35 is not the same as the original message 35, the evaluation module 65 determines whether the data digits 50 of the resent event message are included in the subset of interpretations of the original event message (step 180). If the resent message is not included in the stored interpretations, steps 150, 155, 160 and 165 are repeated. If the resent message is included in the stored interpretations, the evaluation module determines if there are multiple correct interpretations of the resent message compared to the stored interpretations (step 185). If there is only one correct interpretation of the resent message, the evaluation module 65 increases the number of variation flags used in its analysis and can determine that the variation flags of the resent message are not too high compared to the protocol standards (step 190). The receiver 25 then confirms receipt of the event message 35 by sending an acknowledgment tone to the premises equipment 20 (step 140). If there are multiple correct interpretations of the resent message compared to the stored message interpretations (step 185) or the variation flags detected in the retried event message 35 by the evaluation module 65 are not lower than the newly selected protocol level (step 190), the evaluation module 65 rejects the event message 35, eliminates invalid interpretations (step 150), stores valid interpretations (step 155) and sends a protocol NAK message (step 160).

It should also be noted that there are other scenarios that could be implemented where the results of the first and second analyses of the event message 35 do not match and have similar probabilities that would require a third transmission of the message 35.

In addition, implementations of the invention may be adjusted to accommodate or account for the processing speed and capabilities of the hardware used, particularly the receiving equipment 25. A reduced or "lightweight" version of the invention is possible where the focus is on the digit time durations. For example, the minimum "on" time for digit 50 of time must be 0.4 times the protocol value. When two different "on" digits 50 are detected in the same signal, then no "off" or quiet digit 55 time is required. If the "off" or quiet digit time is greater than three times the protocol standard time duration, then the event message 35 is considered invalid. If the length of the "on" digit 50 exceeds 2.75 times the protocol standard time duration, but is less than 6 times the standard time duration then the results will be considered two digits of the same value. Time durations six times or greater than the protocol standard time duration will cause the event message 35 to be considered invalid.

Various features and advantages of the invention are set forth in the following claims.

What is claimed is:

1. A method of processing an event message sent from premises equipment to a monitoring location, the method comprising:
    evaluating the entire event message, at the monitoring location, based on a number of digits received compared to expected receiving parameters defined in a communication protocol;
    determining a number of possible interpretations of the event message;
    eliminating one or more possible interpretations of the event message based on the number of digits in each of the possible interpretations and the parameters of the communication protocol to create a subset of possible interpretations;
    rejecting the event message sent by the premises equipment when there is more than one correct interpretation of the event message; and
    determining receipt of the event message by selecting one possible interpretation from the subset of possible interpretations based upon the number of digits received by the monitoring location within a predetermined protocol time.

2. The method according to claim 1, further comprising resending the event message by the premises equipment after a rejection and creating a resent event message when event message retry attempts, set by the communication protocol, are available.

3. The method according to claim 2, further comprising evaluating the entire resent event message, comparing the digits of the resent event message with the digits of an original event message, and verifying whether one of the interpretations of the original event message includes the digits of the resent event message.

4. The method according to claim 1, further comprising setting numbers of variation flags corresponding to parameters defined in the communication protocol.

5. The method according to claim 1, wherein the premises equipment includes at least one of a fire alarm system, a security system, or an access control system.

6. The method according to claim 1, further comprising eliminating failed event messages that are disrupted by interference or faults in a transmitting network or the premises equipment.

7. The method according to claim 1, wherein the event message is evaluated based on the number of digits received and not based on the specific timing of each digit defined by the communication protocol.

8. The method according to claim 7, further comprising defining timing parameters of the event message in a specification of the communication protocol.

9. The method according to claim 1, wherein the digits of the event message are dual tone multiple frequency ("DTMF") digits and include data digits and quiet digits.

10. The method according to claim 1, wherein the digits of the event message are frequency shift keying ("FSK") digits and include data digits and carrier digits.

11. The method according to claim 1, further comprising removing timing parameters of the event message that are influenced by distortions caused by the premises equipment and the transmitting network.

12. A system for processing an incoming signal, the system comprising:
a receiver configured to evaluate and receive an event message sent from premises equipment and having a number of digits,
wherein the receiver evaluates the entire event message based on the number of digits received compared to expected receiving parameters defined in a communication protocol, determines receipt of the event message based upon the number of digits received by the receiver within a predetermined protocol time, and is configured to reject the event message sent from the premises equipment when there is more than one correct interpretation of the event message.

13. The system of claim 12, wherein the premises equipment is configured to resend the event message after a rejection and to create a resent event message when event message retry attempts, set by the communication protocol, are available.

14. The system of claim 13, wherein the receiver is configured to evaluate the entire resent event message, compare the digits of the resent event message with the digits of an original event message, and verify whether one of the interpretations of the original event message includes the digits of the resent event message.

15. The system of claim 12, wherein the receiver is configured to set numbers of variation flags corresponding to parameters defined by the communication protocol.

16. The system of claim 12, wherein the receiver is configured to eliminate failed event messages that are disrupted by interference or faults in a transmitting network or the premises equipment.

17. The system of claim 12, wherein the digits of the event message comprise dual tone multiple frequency ("DTMF") digits that include data digits and quiet digits.

18. The system of claim 12, wherein the digits of the event message comprise frequency shift keying ("FSK") digits that include data digits and carrier digits.

19. The system of claim 12, wherein the receiver is configured to establish a communication channel between the premises equipment and a monitoring location based on a handshake tone.

20. The system of claim 19, wherein the receiver is configured to determine a number of possible interpretations of the event message.

21. The system of claim 20, wherein the receiver is configured to eliminate one or more possible interpretations of the event message based on the number of digits in each of the possible interpretations and the parameters of the communication protocol to create a subset.

* * * * *